United States Patent [19]
Bellegarda

[11] Patent Number: 5,839,106
[45] Date of Patent: Nov. 17, 1998

[54] LARGE-VOCABULARY SPEECH RECOGNITION USING AN INTEGRATED SYNTACTIC AND SEMANTIC STATISTICAL LANGUAGE MODEL

[75] Inventor: Jerome R. Bellegarda, Los Gatos, Calif.

[73] Assignee: Apple Computer, Inc., Cupertino, Calif.

[21] Appl. No.: 768,122

[22] Filed: Dec. 17, 1996

[51] Int. Cl.$^6$ ................................. G01L 5/06; G01L 9/06
[52] U.S. Cl. .......................... 704/257; 704/243; 704/255
[58] Field of Search ................................. 704/243, 255, 704/257

[56] References Cited

U.S. PATENT DOCUMENTS

| | | | |
|---|---|---|---|
| 5,384,892 | 1/1995 | Strong | 704/243 |
| 5,502,774 | 3/1996 | Bellagarde | 704/252 |

OTHER PUBLICATIONS

Bernstein, Macrophone: . . . Speech Corpus. . . , IEEE/ICASSP, pp. 1–81 to 1–84, Apr. 22, 1994.

*Primary Examiner*—David R. Hudspeth
*Assistant Examiner*—Robert Louis Sax
*Attorney, Agent, or Firm*—Burns, Doane, Swecker & Mathis, L.L.P.

[57] ABSTRACT

Methods and apparatus for performing large-vocabulary speech recognition employing an integrated syntactic and semantic statistical language model. In an exemplary embodiment, a stochastic language model is developed using a hybrid paradigm in which latent semantic analysis is combined with, and subordinated to, a conventional n-gram paradigm. The hybrid paradigm provides an estimate of the likelihood that a particular word, chosen from an underlying vocabulary will occur given a prevailing contextual history. The estimate is computed as a conditional probability that a word will occur given an "integrated" history combining an n-word, syntactic-type history with a semantic-type history based on a much larger contextual framework. Thus, the exemplary embodiment seamlessly blends local language structures with global usage patterns to provide, in a single language model, the proficiency of a short-horizon, syntactic model with the large-span effectiveness of semantic analysis.

45 Claims, 3 Drawing Sheets

LARGE-VOCABULARY SPEECH RECOGNITION USING AN INTEGRATED SYNTACTIC AND SEMANTIC STATISTICAL LANGUAGE MODEL

FIELD OF THE INVENTION

The present invention relates to speech recognition and, more particularly, to language modeling in large-vocabulary speech recognition systems.

BACKGROUND OF THE INVENTION

Speech recognition, generally, is the process of converting an acoustic signal into a linguistic message. In certain applications, for example where a speech recognition processor serves as a user interface to a database query system, the resulting message may need to contain just enough information to reliably communicate a speaker's goal. However, in applications such as automated dictation or computer data entry, it may be critical that the resulting message represent a verbatim transcription of a sequence of spoken words. In either event, an accurate statistical, or stochastic, language model is desirable for successful recognition.

As is described in more detail below, stochastic language models are commonly used in speech recognition systems to constrain acoustic analyses, to guide searches through various text hypotheses, and to aide in the determination of final text transcriptions. Therefore, it is vital that a stochastic language model be easily implementable and highly reliable. For reasons described below, however, available language modeling techniques have proven less than adequate for many real world applications. For example, while many existing models perform satisfactorily in small-vocabulary contexts in which the range of spoken words input to a recognition system is severely limited (e.g., to 1000 words or less), relatively few known models are even tractable in large-vocabulary contexts in which the range of possible spoken words is virtually unlimited (e.g., 20,000 words or more).

Traditionally, language models have relied upon the classic n-gram paradigm to define the probability of occurrence, within a spoken vocabulary, of all possible sequences of n words. Because it emphasizes word order, the n-gram paradigm is properly cast as a syntactic approach to language modeling. Also, because it provides probabilities for relatively small groups of words (i.e., n is typically less than the number of words in a sentence of average length), the n-gram paradigm is said to impose local language constraints on the speech recognition process.

Given a language model consisting of a set of a priori n-gram probabilities, a conventional speech recognition system can define a "most likely" linguistic output message based on an acoustic input signal. However, because the n-gram paradigm does not contemplate word meaning, and because limits on available processing and memory resources preclude the use of models in which n is made large enough to incorporate global language constraints, models based purely on the n-gram paradigm are not always sufficiently reliable. This is particularly true in modem, large-vocabulary applications.

Furthermore, an n-gram based model is only as reliable as are its underlying a priori probabilities, and such probabilities are often difficult to ascertain. Though they may be empirically estimated using relative frequency counts based on machine-readable training databases, constraints on the size of available databases often result in inaccurate approximations. As a result, various parameter estimation, smoothing, and class-based processing techniques have been developed. Broadly speaking, such techniques attempt to better estimate the conditional probability of a word, given a particular context, by also observing other words which are used similarly in the given context. Nonetheless, the limitations associated with presently available databases and computing resources still make it extremely difficult to go much beyond $n \leq 4$. Thus, even considering these improved estimation techniques, n-gram based systems offer limited success for today's large-vocabulary applications.

To circumvent the limitations associated with the n-gram paradigm, alternative language models have been developed. Rather than using brute force to incorporate global language constraints (i.e., making n larger in the n-gram paradigm), these alternative approaches use finesse to expand the effective context which is used in computing probabilities from just a few words to a much larger span (e.g., a sentence, a paragraph, or even an entire document). Generally speaking, these techniques attempt to capture meaningful word associations within a more global language context. Thus, they represent a semantic approach to language modeling.

Known semantic approaches include formal parsing mechanisms and trigger pairs. See, for example, K. W. Church, *Phonological Parsing in Speech Recognition*, New York: Kluwer Academic Publishers, 1987 as well as R. Lau, R. Rosenfeld, and S. Roukos, "Trigger-Based Language Models: A Maximum Entropy Approach," *Proc. 1994 Int. Conf. Acoust., Speech, Signal Proc.*, Adelaide, Australia, pp. II45–II48, April, 1994. However, while parsing techniques have proven useful in certain small-vocabulary recognition applications, they are as yet impractical for use in large-vocabulary systems. Additionally, trigger pairs have proven reliable in only a few limited circumstances. They remain impracticable in most real world applications.

Recently, improved semantic analysis techniques have been developed. See, for example, U.S. patent application Ser. No. 08/643,521, filed May 6, 1996 and entitled "A Method and System for Deriving a Large-Span Semantic Language Model for Large-Vocabulary Recognition Systems", which is incorporated herein by reference. The cited application describes an approach which relies on latent semantic analysis. Generally, latent semantic analysis is a data-driven technique which, given a corpus of training text, describes which words appear in which global contexts (e.g., which documents). This allows words to be represented as vectors in a convenient vector space. However, the full power of latent semantic analysis has yet to be exploited.

Furthermore, even though the various known semantic models may ultimately prove beneficial in certain applications, the inherent lack of tight local word order constraints in such models may ultimately prevent their widespread acceptance and use. Thus, there is an immediate need for an improved approach to stochastic language modeling, particularly in the context of large-vocabulary speech recognition systems.

SUMMARY OF THE INVENTION

The present invention fulfills the above-described and other needs by providing methods and apparatus for performing large-vocabulary speech recognition using a hybrid stochastic language model which seamlessly combines syntactic and semantic analyses. In exemplary embodiments, a hybrid language model is developed using an integrated paradigm in which latent semantic analysis is combined with, and subordinated to, a conventional n-gram paradigm. The integrated paradigm provides an estimate of the likelihood that a word, chosen from an underlying vocabulary, will occur given a prevailing contextual history. The estimate is computed as a conditional probability that a word will occur given an "integrated" history which combines an n-word, syntactic-type history with a semantic-type history based on a much larger contextual framework. Thus, exemplary embodiments of the present invention seamlessly blend local language structures with global usage patterns to provide, in a single language model, the proficiency of a short-horizon, syntactic model with the large-span effectiveness of semantic analysis.

In one exemplary embodiment, a speech recognition system includes a signal pre-processor and a speech recognition processor. The signal pre-processor receives an audio signal and processes the audio signal to produce a digital sequence suitable for speech recognition. The speech recognition processor then receives the digital sequence from the signal pre-processor and processes it to form a linguistic message. In processing the digital sequence, the recognition processor utilizes a hybrid stochastic language model including both local and global context constraints.

These and other features of the present invention are explained hereinafter with reference to the accompanying drawings. Those skilled in the art will appreciate that the exemplary embodiments described below are provided for purposes of illustration only and that multiple equivalent embodiments of the present invention are contemplated herein.

DETAILED DESCRIPTION OF THE PREFERRED EMBODIMENTS

Figure 1:
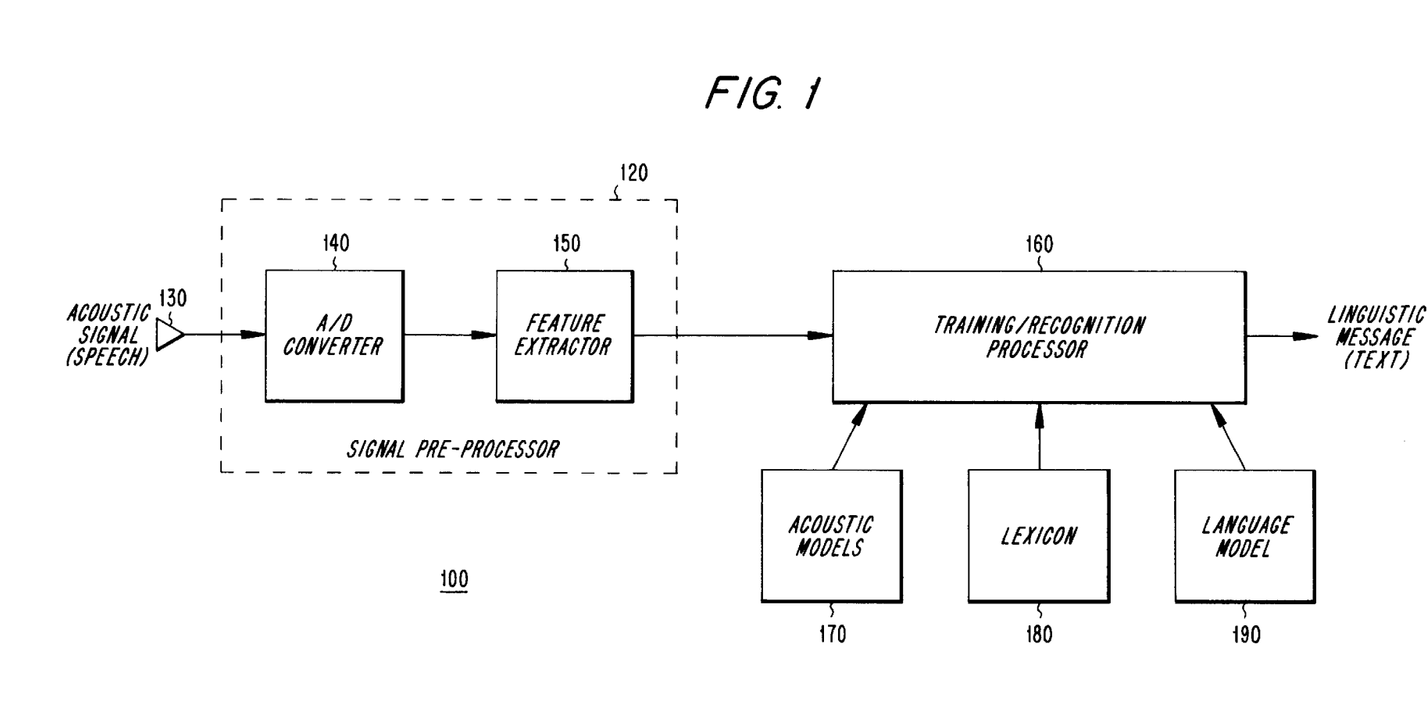
FIG. 1 is a block diagram of a speech recognition system which may be used, for example, to implement the teachings of the present invention.

FIG. 1 depicts a conventional speech recognition system 100 including a transducer 130, a signal pre-processor 120, a recognition processor 160, an acoustic model 170, a lexicon 180, and a language model 190. The signal pre-processor 120 includes an analog-to-digital (A/D) converter 140 and a feature extractor 150. As shown, an acoustic signal is input to the transducer 130, and an output of the transducer 130 is coupled to an input of the A/D converter 140. An output of the A/D converter 140 is in turn coupled to an input of the feature extractor 150, and an output of the feature extractor 150 is coupled to an input of the recognition processor 160. The recognition processor 160 receives input from a set of acoustic models 170, the lexicon 180, and the language model 190 and produces a linguistic message output. Such a system is described, for example, in L. R. Bahl, F. Jelinek, and R. L. Mercer, "A Maximum Likelihood Approach to Continuous Speech Recognition," *IEEE Trans. Pattern Anal. Mach. Intel.*, Vol. PAMI-5, No. 2, pp. 179–190, March 1983, which is incorporated herein by reference.

In operation, an acoustic speech signal is input to the system 100 using the transducer 130, which may be for example a microphone. A corresponding analog electrical signal, output by the transducer 130, is then converted to digital form by the A/D converter 140. The resulting digital speech samples are then processed in successive time intervals within the feature extractor 150, using conventional methods, to produce a sequence of acoustic feature vectors. The resulting feature vectors are optionally converted, using known vector quantization techniques, into a sequence of discrete feature code-words representative of various acoustic prototypes. The feature vectors, or code-words, are then transformed by the recognition processor 160 to produce an appropriate linguistic message output.

As described in the reference by Bahl, Jelinek, and Mercer, cited above, the recognition processor 160 utilizes the set of acoustic models 170, the lexicon 180, and the language model 190, in combination, to constrain and make workable the transformation process. In brief, the set of acoustic models 170, (e.g., well known Hidden Markov Models) is used to evaluate the feature vectors output by the feature extractor 150 against basic units of speech, such as phonemes or allophones. The most likely basic units of speech are then processed, in accordance with information provided by the lexicon 180 and the language model 190, to generate the final linguistic message output.

Generally, the lexicon 180 defines the vocabulary of the recognition system 100 in terms of the basic speech elements (words), and the language model 190 defines allowable sequences of vocabulary items. As described above, the language model 190 may be a stochastic language model which provides a set of a priori probabilities, each probability indicating a likelihood that a given word may occur in a particular context. Such a set of a priori probabilities may be used, for example, to help search for and prioritize candidate output messages based on sequences of basic speech elements. Note, however, that the precise method by which the recognition processor 160 utilizes the language model 190 to create an output message from a sequence of basic speech units is not necessary for an understanding of the present invention. A detailed description of such process is, therefore, beyond the scope of the present disclosure, and the fact that the recognition processor 160 can employ a suitably defined language model 190 to generate linguistic messages is taken as given herein.

In a conventional speech recognition system, the language model 190 is a single-span, or single-context, language model. In other words, the language model 190 may be a syntactic model (e.g., an n-gram model), providing a set of a priori probabilities based on a local word context, or it may be a semantic model (e.g., a latent semantic model), providing a priori probabilities based on a global word context. As is described above, however, neither single-span model is ideal. As a result, conventional systems are inadequate for many large-vocabulary applications.

According to the conventional syntactic approach, the language model 190 provides a set of n-gram a priori probabilities, each of which defines the likelihood that a particular word within the system vocabulary (defined by the lexicon 180) will occur immediately following a string of n-1 words which are also within the system vocabulary. More concisely, the language model 190 provides, for each word $w_q$ in an available vocabulary V, a conditional probability $\Pr(w_q|H_q^{(l)})$ that the word $w_q$ will occur given a local context, or history, $H_q^{(l)}$ consisting of a string of n-1 words $w_{q-1} w_{q-2} \cdots w_{q-n+1}$, as follows:

$$\Pr(w_q|H_q^{(l)}) = \Pr(w_q|w_{q-1} w_{q-2} \cdots w_{q-n+1}). \tag{1}$$

Given a set of a priori probabilities defined in accordance with equation (1), the recognition processor 160 can search for, and assess the likelihood of, various text hypotheses in producing the output message. As is well known, the a priori probabilities $Pr(w_q|H_q^{(l)})$ can be estimated during a training phase using existing text databases. For example, the Linguistic Data Consortium sponsored by the Advanced Research Project Agency (ARPA) provides a wide range of application-specific databases which can be used for training purposes. As described above, however, unreliable estimates and a lack of global constraints render the local-span n-gram model impractical in many large-vocabulary applications.

In contrast to the n-gram approach, known semantic analyses provide single-span language models incorporating global constraints. For example, according to the latent semantic model disclosed in U.S. patent application Ser. No. 08/643,521, incorporated by reference above, the language model 190 may provide a set of global conditional probabilities, each defining a likelihood that a particular word within the system vocabulary will occur given a specified global context. The global context might comprise, for example, documents selected from a set of training documents which are tailored, prior to recognition, to suit a particular application. Alternately, the global context might be dynamic with respect to the recognition process, comprising for example a relatively long (e.g., 1000-word) text message representing the most recent output of the recognition processor 160.

In concise terms, the latent semantic model provides, for every word $w_q$ in a system vocabulary V, a conditional probability $Pr(w_q|H_q^{(g)})$ that the word $w_q$ will occur given a global context, or history, $H_q^{(g)}$ consisting of a broad word span, or document, $d_q$, as follows:

$$Pr(w_q|H_q^{(g)}) = Pr(w_q|d_q) = \sum_{k=1}^{K} Pr(w_q|C_k)Pr(C_k|d_q). \quad (2)$$

In equation (2), $C_k$ denotes one of a set of K word clusters which span the underlying word/document space. These clusters can be interpreted as a convenient representation of the semantic events occurring in the training database. Thus, equation (2) translates the fact that the probability of a word depends on its importance relative to each semantic event as well as the importance of the semantic event itself. As described in U.S. patent application Ser. No. 08/643,521, incorporated above, the intermediate probabilities $Pr(w_q|C_k)$ and $Pr(C_k|d_q)$ can be obtained using suitable multi-variate distributions. Generally, such distributions are induced by appropriate distance measures defined in the vector space representation which results from the singular value decomposition framework of latent semantic analysis.

As with the syntactic single-span model, the recognition processor 160 of FIG. 1 can employ a set of semantic a priori probabilities defined in accordance with equation (2) to search for and prioritize various text hypotheses when generating output messages. As described above, however, this semantic single-span model does not incorporate potentially useful local language constraints. Thus, a conventional speech recognition system employing a single-span language model may not be adequate for certain large-vocabulary applications, irrespective of whether the single-span model is syntactic or semantic in nature.

Advantageously, the present invention teaches that the above-described problems associated with conventional, single-span systems may be overcome by strategically integrating the beneficial features of both language model types. In other words, the present invention teaches that it is possible to combine local constraints, such as those provided by the n-gram paradigm, with global constraints, such as those provided by a latent semantic model, to integrate both syntactic and semantic information into a single, hybrid language model.

Figure 2:
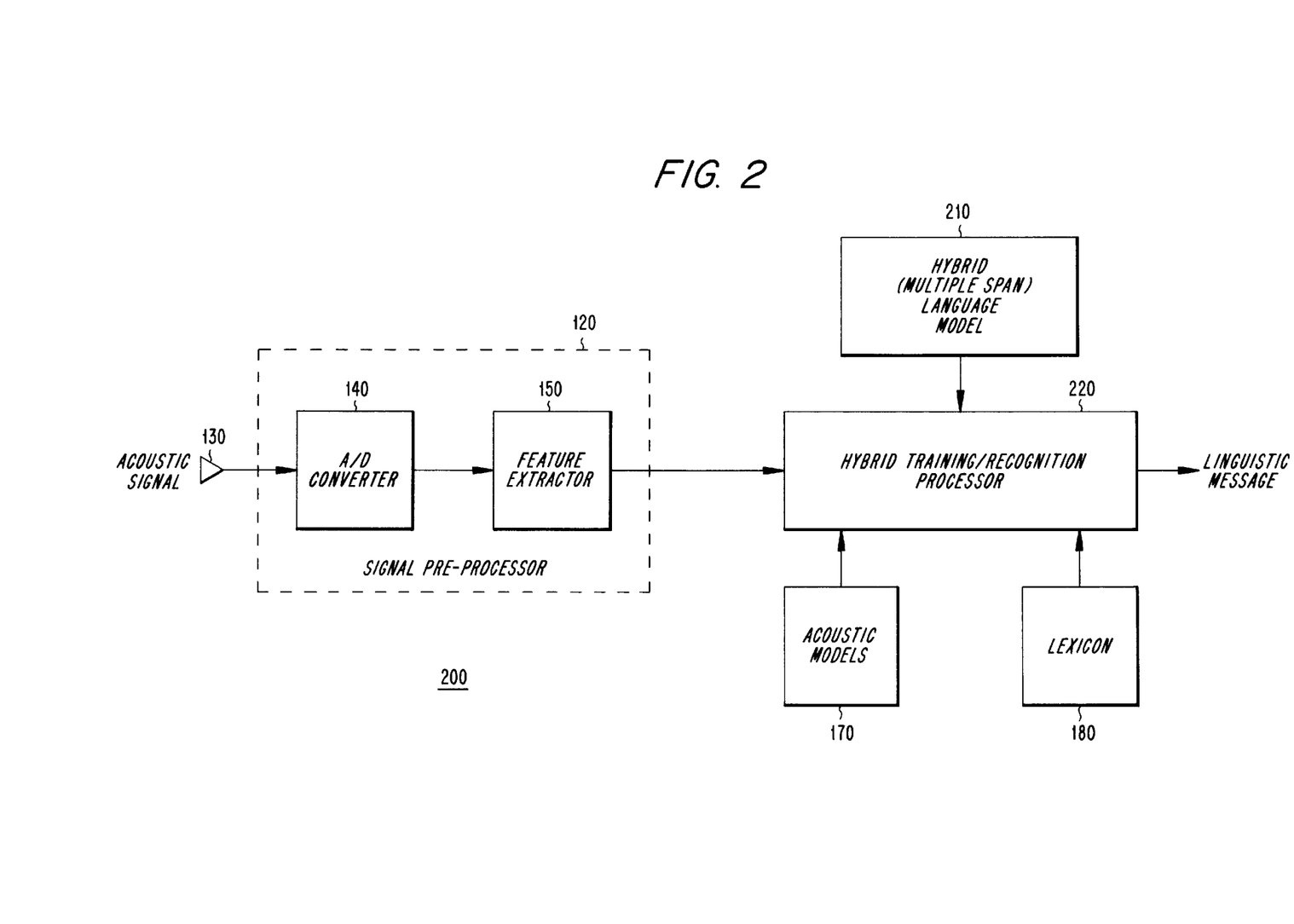
FIG. 2 is a more detailed block diagram of a speech recognition system which may be used, for example, to implement the teachings of the present invention.

FIG. 2 depicts an exemplary speech recognition system 200 constructed in accordance with the teachings of the present invention. As shown, the exemplary system 200 includes a transducer 130, a signal pre-processor 120, a hybrid recognition processor 220, an acoustic model 170, a lexicon 180, and a hybrid, multiple-span language model 210. The signal pre-processor 120 includes an analog-to-digital (A/D) converter 140 and a feature extractor 150. As shown, an acoustic signal is input to the transducer 130, and an output of the transducer 130 is coupled to an input of the A/D converter 140. An output of the A/D converter 140 is in turn coupled to an input of the feature extractor 150, and an output of the feature extractor 150 is coupled to an input of the hybrid recognition processor 220. The hybrid recognition processor 220 receives input from the acoustic model 170, the lexicon 180, and the hybrid language model 210 and produces a linguistic message output.

In operation, the transducer 130, the signal pre-processor 120, the acoustic model 170, and the lexicon 180 function as is described above with respect to FIG. 1. Therefore, a detailed description of their operation is not repeated here. However, in contrast to conventional processors, the hybrid processor 220 of FIG. 2 carries out speech recognition using a hybrid language model 210 which combines local and global language constraints to realize both syntactic and semantic modeling benefits. Implementation of the hybrid language model 210 is next described with reference to FIGS. 3(a)–(c).

Figure 3A:
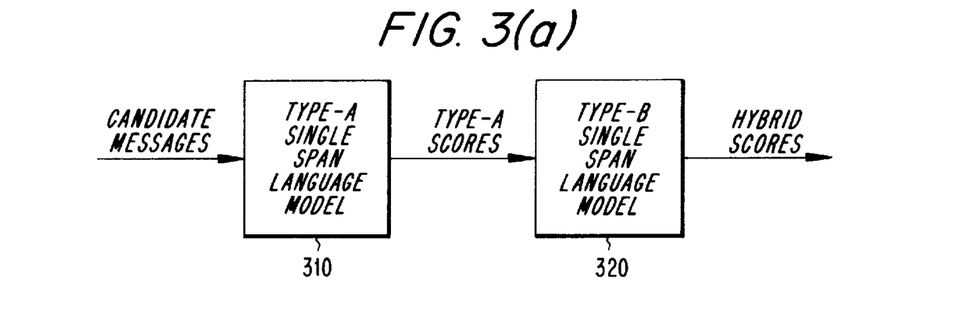
FIGS. 3(a)-(c) represent alternative speech recognition processing techniques which are taught by the present invention.

According to exemplary embodiments, hybrid processing can be carried out in several different ways. One form of hybrid processing, depicted conceptually in FIG. 3(a), is carried out using a two-pass approach during the recognition process. As shown, a first single-span language model 310, based on a first type of language constraint, is used to generate a first set of likelihoods, or scores, for a group of "most likely" candidate output messages. Then, a second single-span language model 320, based on a second (different) type of language constraint, is used to process the first set of scores to produce a second set of improved, hybrid scores. In FIG. 3(a) the first and second language models 310, 320 are respectively labeled "Type-A" and "Type-B" to indicate that, if the first model 310 is a syntactic model, then the second model 320 is a semantic model, and vice versa. Because the resulting hybrid scores incorporate both local and global constraints, they are inherently more reliable than scores computed using either single-span model standing alone.

By way of example, the hybrid recognition processor 220 might use an n-gram syntactic-type first model 310 to produce a list of candidate text messages from a sequence of feature vectors, and then employ a latent semantic-type second model 320 to rescore the list so that the most likely candidate, or hypothesis, is moved to the top of the list as necessary. Of course, such a sequential approach to integration will fail if the correct hypothesis is not included in the original list of candidates produced during the first recognition pass. Such failure may be prevented, however, by producing a relatively long list of candidates during the first pass, so that the original list is virtually guaranteed to include the correct hypothesis. If so, then the sequential, two-pass embodiment of FIG. 3(a) may be relatively computationally intensive, and the benefits derived from such an embodiment will depend upon the speed and size of available processing and memory resources.

Figure 3B:
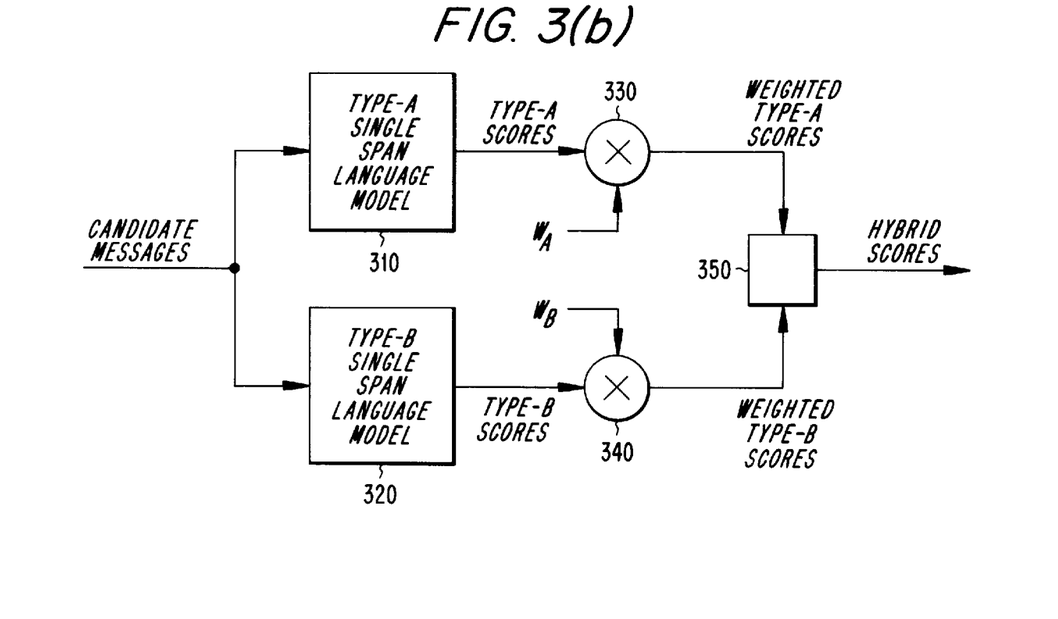

FIG. 3(b) depicts an alternative form of hybrid processing in which the beneficial aspects of syntactic and semantic modeling are achieved in a single recognition pass. As shown, two different single-span language models 310,320 are used, in parallel, to compute two independent sets of scores for two groups of most likely candidate outputs. As in FIG. 3(a), the first and second language models 310,320 are respectively labeled "Type-A" and "Type-B" to indicate that, if the first model 310 is syntactic, then the second model 320 is semantic, and vice versa.

As shown, a pair of multipliers 330,340 is used to weight each resulting set of scores by a respective weighting coefficient $W_A, W_B$. Each of the weighting coefficients $W_A, W_B$ indicates a relative degree of confidence in the corresponding single-span model and may be computed empirically, prior to recognition, by running trials using the appropriate single-span model standing alone. The resulting weighted scores are then merged using a combining device 350 (e.g., a summing device) to form an improved set of hybrid scores. Because the hybrid scores incorporate both local and global constraints, they will be inherently more reliable than scores computed using either single-span model standing alone. Again, however, because two independent language models are employed, the benefits derived from the embodiment of FIG. 3(b) will depend in part upon available computing resources.

Figure 3C:
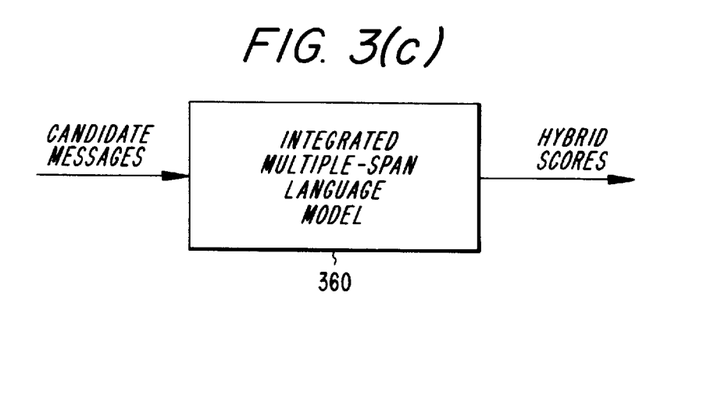

FIG. 3(c) depicts yet another approach to hybrid processing. As shown, a set of hybrid scores, corresponding to a group of most likely candidate output messages, is computed in a single recognition pass using an integrated, multiple-span language model 360. Conceptually, the integrated language model 360 uses a primary single-span paradigm incorporating one form of language constraint (i.e., either syntactic or semantic) to compute scores which are adjusted "on the fly" using a subordinate single-span paradigm incorporating an alternative language constraint (i.e., if the primary paradigm is syntactic, then the subordinate paradigm is semantic, and vice versa). However, according to exemplary embodiments, the primary and subordinate single-span paradigms are seamlessly blended to form one, composite, multi-span paradigm simultaneously incorporating both syntactic and semantic language constraints. The precise form of the composite, multi-span paradigm depends upon which type of single-span paradigm is made subordinate to the other.

As described below, one single-span paradigm is made subordinate to another by making appropriate assumptions with respect to conditional probabilities which are used to construct the composite, multi-span paradigm. Conceptually, subordinating the n-gram paradigm to the latent semantic paradigm amounts to driving the recognition process using global constraints while fine-tuning it using local constraints. On the other hand, subordinating the latent semantic paradigm to the n-gram paradigm yields a recognition process which proceeds locally while taking global constraints into account. Intuitively, both techniques are superior to conventional, single-span approaches, and both techniques are contemplated in the method depicted in FIG. 3(c).

In an exemplary embodiment, latent semantic analysis is subordinated to the n-gram paradigm to effectively integrate semantic information into a search that is primarily syntactically driven. The resulting language model is therefore properly described as a modified n-gram incorporating large-span semantic information.

In accordance with the exemplary embodiment, an integrated paradigm is defined by computing a conditional probability $\Pr(w_q|H_q^{(h)})$ that a particular word $w_q$ will occur, given a hybrid history $H_q^{(h)}$ comprising a local history $H^{(l)}$ and a global history $H^{(g)}$. The local history $H^{(l)}$ includes a string of n-1 words $w_{q-1} w_{q-2} \ldots w_{q-n+1}$ as is described above with respect to the n-gram paradigm, and the global history $H^{(g)}$ includes a broad word span, or document, $d_q$ as is described above with respect to latent semantic analysis. Such a composite conditional probability can be written, generally, as follows:

$$\Pr(w_q|H_q^{(h)}) = \Pr(w_q|H_q^{(l)}, H_q^{(g)}) = \Pr(w_q|w_{q-1} w_{q-2} \ldots w_{q-n+1}, d_q). \quad (3)$$

By definition, the conditional probability $\Pr(w_q|H_q^{(h)})$ that a particular word $w_q$ will occur, given an immediate context $w_{q-1} w_{q-2} \ldots w_{q-n+1}$ and a relevant document $d_q$, can be computed explicitly by dividing the probability of the particular word $w_q$ and the document $d_q$, given the immediate context $w_{q-1} w_{q-2} \ldots w_{q-n+1}$, by a summation which includes, for every individual word $w_i$ in the system vocabulary V, the probability of the individual word $w_i$ and the document $d_q$, given the immediate context $w_{q-1} w_{q-2} \ldots w_{q-n+1}$ of the particular word $w_q$. In other words, the composite conditional probability can be written as follows:

$$\Pr(w_q|H_q^{(h)}) = \frac{\Pr(w_q, d_q|w_{q-1} w_{q-2} \ldots w_{q-n+1})}{\sum_{w_i \in V} \Pr(w_i, d_q|w_{q-1} w_{q-2} \ldots w_{q-n+1})}. \quad (4)$$

According to the exemplary embodiment, it is assumed that the probability of the particular word $w_q$, given the relevant document $d_q$ for the word $w_q$, is independent of the immediate context $w_{q-1} w_{q-2} \ldots w_{q-n+1}$ of the word $w_q$. This is a reasonable assumption given that different syntactic constructs are often used in a language to carry the same meaning. Thus, the probability of the particular word $w_q$ and the document $d_q$, given the immediate context $w_{q-1} w_{q-2} \ldots w_{q-n+1}$, can be computed as a product of the probability of the particular word $w_q$, given the document $d_q$, and the probability of the document $d_q$, given the immediate context $w_{q-1} w_{q-2} \ldots w_{q-n+1}$. In other words, the numerator of equation (4) can be expanded as follows:

$$\Pr(w_q, d_q|w_{q-1} w_{q-2} \ldots w_{q-n+1}) = \Pr(w_q|d_q)\Pr(d_q|w_{q-1} w_{q-2} \ldots w_{q-n+1}), \quad (5)$$

According to the exemplary embodiment, it is also assumed that the probability of the relevant document $d_q$ for the particular word $w_q$, given the immediate context $w_{q-1} w_{q-2} \ldots w_{q-n+1}$ of the word $w_q$, is equal to the probability of the word $w_q$, given its immediate context $w_{q-1} w_{q-2} \ldots w_{q-n+1}$. Such an assumption effectively subordinates the latent semantic model to the n-gram paradigm. In other words, the assumption is that, on the basis of just the immediate context $w_{q-1} w_{q-2} \ldots w_{q-n+1}$, the only prediction that can be made with respect to the relevant document $d_q$ is a prediction of the word $w_q$ itself. Thus, the probability of the particular word $w_q$ and the document $d_q$, given the immediate context $w_{q-1} w_{q-2} \ldots w_{q-n+1}$, can be computed more simply as a product of the probability of the particular word $w_q$, given the document $d_q$, and the probability of the particular word $w_q$, given the immediate context $w_{q-1} w_{q-2} \ldots w_{q-n+1}$. In other words, equation (5) can be simplified to:

$$\Pr(w_q, d_q|w_{q-1} w_{q-2} \ldots w_{q-n+1}) = \Pr(w_q|d_q)\Pr(w_q|w_{q-1} w_{q-2} \ldots w_{q-n+1}), \quad (6)$$

Thus, according to the exemplary embodiment, a composite conditional probability is computed by dividing the product of the probability of the particular word $w_q$, given the document $d_q$, and the probability of the particular word $w_q$, given the immediate context $w_{q-1}w_{q-2} \ldots w_{q-n+1}$, by a summation which includes, for every individual word $w_i$ in the system vocabulary V, a product of the probability of the individual word $w_i$, given the document $d_q$, and the probability of the individual word $w_i$, given the immediate context $w_{q-1}w_{q-2} \ldots w_{q-n+1}$ of the particular word $w_q$. Such a composite probability can be written compactly as:

$$Pr(w_q|H_q) = \frac{Pr(w_q|w_{q-1}w_{q-2} \ldots w_{q-n+1})Pr(w_q|d_q)}{\sum_{w_i \in V} Pr(w_i|w_{q-1}w_{q-2} \ldots w_{q-n+1})Pr(w_i|d_q)}, \quad (7)$$

According to the exemplary embodiment, the composite conditional probability is then used as an integrated paradigm to achieve single-pass recognition in a system such as that depicted in FIG. 2. In other words, integrated a priori probabilities are computed using the composite conditional probability formula, and the integrated a priori probabilities are used to search for and prioritize candidate linguistic messages. Note that, advantageously, each element of the integrated paradigm can be computed in a straightforward manner according to the n-gram and latent semantic paradigms described above. Thus, the integrated paradigm of the exemplary embodiment is easily implemented using available resources.

Note also that the exemplary integrated paradigm can be interpreted in the context of Bayesian estimation. In other words, if the conditional probability $Pr(w_q|d_q)$ of a particular word $w_q$ given a global context $d_q$ is viewed as a prior probability for the word $w_q$, then the composite conditional probability computed above represents a translation of the classical Bayesian estimator of the n-gram (local) probability using a prior distribution obtained from (global) latent semantic analysis. Put another way, equation (7) can be interpreted as an operation which multiplies an n-gram probability by a conditional probability $Pr(w_q|d_q)$ and then renormalizes the resulting product to produce a proper probability, which is analagous to Bayesian estimation. Thus, there exists a rigorous framework for justifying the assumptions made above.

Evaluations of the exemplary paradigm have been conducted using the ARPA North American Business News corpus and imposing the same general experimental conditions described in U.S. patent application Ser. No. 08/643, 521, incorporated above (i.e., 500,000 documents spanning 1987–1993 and including approximately 200 million words; a system vocabulary of 23,000 words; and 2000 latent semantic analysis clusters). The quality of the paradigm was objectively assessed using a test text comprising approximately 2 million words. The objective measure of performance was taken to be the perplexity of the test data, i.e.:

$$PP = \exp\left(-\frac{1}{Q} \sum_{q=1}^{Q} \log Pr(w_q|H_q)\right), \quad (8)$$

where Q denotes the total number of words in the test text. The value obtained for the language model of equation (7) was compared to that obtained using a conventional bigram (n=2) model. Advantageously, the integrated model of equation (7) yielded a reduction in perplexity of approximately 23%.

In sum, the present invention teaches, inter alia, an easily implementable large-vocabulary language model in which the local constraints of an n-gram paradigm are seamlessly and beneficially combined with the global constraints of latent semantic analysis. Those skilled in the art will appreciate that the present invention is not limited to the specific exemplary embodiments which have been described herein for purposes of illustration. The scope of the invention, therefore, is defined by the claims which are appended hereto, rather than the foregoing description, and all equivalents which are consistent with the meaning of the claims are intended to be embraced therein.

What is claimed is:

1. A speech recognition system, comprising:
   a pre-processor receiving an acoustic signal and processing the acoustic signal to produce an acoustic feature sequence; and
   a recognition processor receiving the acoustic feature sequence and processing the acoustic feature sequence using a multiple-span stochastic language model to form a linguistic message, wherein the multiple-span stochastic language model includes a local span providing an immediate word context and a large span providing a global word context.

2. The speech recognition system of claim 1, wherein said recognition processor uses a first single-span language model to produce candidate linguistic messages and a second single-span language model to prioritize the candidate linguistic messages.

3. The speech recognition system of claim 2, wherein one of said first and second single-span language models comprises a priori probabilities computed using an n-gram paradigm and another of said first and second language models comprises a priori probabilities computed using a latent semantic paradigm.

4. The speech recognition system of claim 2, wherein said first single-span language model incorporates local language constraints and said second single-span language model incorporates global language constraints.

5. The speech recognition system of claim 2 wherein said first single-span language model incorporates global language constraints and said second single-span language model incorporates local language constraints.

6. The speech recognition system of claim 1, wherein said recognition processor uses first and second single-span language models, incorporating local and global language constraints, respectively, to produce first and second prioritized groups of candidate linguistic messages.

7. The speech recognition system of claim 6, wherein one of said first and second single-span language models comprises a priori probabilities computed using an n-gram paradigm and another of said first and second language models comprises a priori probabilities computed using a latent semantic paradigm.

8. The speech recognition system of claim 6, wherein the first and second prioritized groups are combined to form a single prioritized group of candidate linguistic messages.

9. The speech recognition system of claim 8, wherein the first and second prioritized groups are weighted prior to being combined.

10. The speech recognition system of claim 1, wherein said speech recognition processor uses an integrated multiple-span language model to produce a prioritized group of candidate linguistic messages.

11. The speech recognition system of claim 10, wherein said integrated multiple-span language model comprises a priori probabilities computed using an n-gram paradigm and a priori probabilities computed using a latent semantic paradigm.

12. The speech recognition system of claim 10, wherein said recognition processor computes, in producing the prioritized group of candidate messages, a conditional probability for a particular word in a system vocabulary given a hybrid contextual history including a global context and a local context.

13. The speech recognition system of claim 10, wherein said recognition processor computes, in producing the prioritized group of candidate messages, a conditional probability for a particular word $w_q$ by dividing (a) a product of a probability of the particular word $w_q$, given a global word sequence $d_q$, and a probability of the particular word $w_q$, given a local word sequence $w_{q-1}w_{q-2} \ldots w_{q-n+1}$, by (b) a summation which includes, for each of a plurality of individual words $w_i$ in a system vocabulary V, a product of a probability of the individual word $w_i$, given the global word sequence $d_q$, and a probability of the individual word $w_i$, given the local word sequence $w_{q-1}w_{q-2} \ldots w_{q-n+1}$.

14. The speech recognition system of claim 10, wherein said recognition processor computes, in producing the prioritized group of candidate messages, a conditional probability $Pr(w_q|H_q^{(h)})$ for a particular word $w_q$, drawn from a vocabulary V containing a plurality of words $w_i$, given a hybrid contextual history $H_q^{(h)}$ including a global word sequence $d_q$ and a local word sequence $w_{q-1}w_{q-2} \ldots w_{q-n+1}$, as:

$$Pr(w_q|H_q^{(h)}) = \frac{Pr(w_q|w_{q-1}w_{q-2} \ldots w_{q-n+1})Pr(w_q|d_q)}{\sum_{w_i \in V} Pr(w_i|w_{q-1}w_{q-2} \ldots w_{q-n+1})Pr(w_i|d_q)},$$

15. The speech recognition system of claim 11, wherein said recognition processor computes said a priori probabilities during a training process.

16. The speech recognition system of claim 11, wherein said a priori probabilities are provided by said integrated language model prior to recognition processing by said recognition processor.

17. The speech recognition system of claim 12, wherein said global context comprises at least one training document.

18. The speech recognition system of claim 12, wherein said global context comprises a linguistic message previously formed by the recognition processor.

19. A method for performing speech recognition, comprising the steps of:
receiving an acoustic signal;
processing the acoustic signal to form an acoustic feature sequence; and
processing the acoustic feature sequence using a multiple-span stochastic language model to form a linguistic message, wherein the multiple-span stochastic language model includes a local span providing an immediate word context and a large span providing a global word context.

20. The method of claim 19, comprising the additional step of storing the linguistic message.

21. The method of claim 19, wherein said step of processing the acoustic feature sequence comprises the steps of using a first single-span language model to produce candidate linguistic messages and then using a second single-span language model to prioritize the candidate linguistic messages.

22. The method of claim 21, wherein one of said first and second single-span language models comprises a priori probabilities computed using an n-gram paradigm and another of said first and second language models comprises a priori probabilities computed using a latent semantic paradigm.

23. The method of claim 21, wherein the first single-span language model incorporates local language constraints and said second single-span language model incorporates global language constraints.

24. The method of claim 21, wherein the first single-span language model incorporates global language constraints and said second single-span language model incorporates local language constraints.

25. The method of claim 19, wherein said step of processing the acoustic feature sequence comprises the step of using first and second single-span language models, incorporating local and global language constraints, respectively, to produce first and second prioritized groups of candidate linguistic messages.

26. The method of claim 25, wherein one of said first and second single-span language models comprises a priori probabilities computed using an n-gram paradigm and another of said first and second language models comprises a priori probabilities computed using a latent semantic paradigm.

27. The method of claim 25, comprising the additional step of combining the first and second prioritized groups to form a single prioritized group of candidate linguistic messages.

28. The method of claim 27, comprising the additional step of weighting the first and second prioritized groups prior to said step of combining.

29. The method of claim 19, wherein said step of processing the acoustic feature sequence comprises the step of using an integrated multiple-span language model to produce a prioritized group of candidate linguistic messages.

30. The method of claim 29, wherein said step of using an integrated multiple-span language model comprises the step of subordinating a first single-span language model to a second single-span language model.

31. The method of claim 30, wherein said first single-span language model comprises local language constraints and said second single-span language model comprises global language constraints.

32. The method of claim 30, wherein said first single-span language model comprises global language constraints and said second single-span language model comprises local language constraints.

33. The method of claim 29, wherein said integrated multiple-span language model comprises a priori probabilities computed using an n-gram paradigm and a priori probabilities computed using a latent semantic paradigm.

34. The method of claim 29, wherein said step of using an integrated multiple-span language model comprises the step of computing a conditional probability for a particular word in a system vocabulary given a hybrid contextual history including a global context and a local context.

35. The method of claim 29, wherein said step of using an integrated multiple-span language model comprises the step of computing a conditional probability for a particular word $w_q$ by dividing (a) a product of a probability of the particular word $w_q$, given a global word sequence $d_q$, and a probability of the particular word $w_q$, given a local word sequence $w_{q-1}w_{q-2} \ldots w_{q-n+1}$, by (b) a summation which includes, for each of a plurality of individual words $w_i$ in a system vocabulary V, a product of a probability of the individual word $w_i$, given the global word sequence $d_q$, and a probability of the individual word $w_i$, given the local word sequence $w_{q-1}w_{q-2} \ldots w_{q-n+1}$.

36. The method of claim 29, wherein said step of using an integrated multiple-span language model comprises the step of computing a probability $Pr(w_q|H_q^{(h)})$ for a particular word $w_q$, drawn from a vocabulary V containing a plurality of words $w_i$, given a hybrid contextual history $H_q^{(h)}$ including a global word sequence $d_q$ and a local word sequence $w_{q-1}w_{q-2} \ldots w_{q-n+1}$, as:

$$Pr(w_q|H_q^{(h)}) = \frac{Pr(w_q|w_{q-1}w_{q-2} \ldots w_{q-n+1})Pr(w_q|d_q)}{\sum_{w_i \in V} Pr(w_i|w_{q-1}w_{q-2} \ldots w_{q-n+1})Pr(w_i|d_q)},$$

37. A method for deriving a multiple-span stochastic language model, comprising the steps of:

reading at least one training document;

using an n-gram paradigm to compute a set of local a priori probabilities based on said at least one training document;

using a latent semantic paradigm to compute a set of global a priori probabilities based on said at least one training document; and combining the local a priori probabilities and the global a priori probabilities to provide the multiple-span stochastic language model.

38. The method of claim 37, comprising the additional step of storing the local and global a priori probabilities.

39. The method of claim 37, wherein the local and global a priori probabilities are combined to form a set of hybrid a priori probabilities.

40. A computer readable medium containing program instructions for deriving a multiple-span stochastic language model, the program instructions including instructions for:

reading at least one training document;

computing a set of local a priori probabilities, based on said at least one training document, using an n-gram paradigm;

computing a set of global a priori probabilities, based on said at least one training document, using a latent semantic paradigm; and combining the local a priori probabilities and the global a priori probabilities to provide the multiple-span stochastic language model.

41. The method of claim 40, comprising the additional step of storing the local and global a priori probabilities.

42. The method of claim 40, wherein the local and global a priori probabilities are combined to form a set of hybrid a priori probabilities.

43. A system for deriving a multiple-span stochastic language model, comprising:

at least one training document; and a processor receiving the at least one training document as input and (a) counting occurrences of local and global word sequences in said at least one training document, (b) computing a set of local a priori probabilities using an n-gram paradigm based on relative frequency counts of local word sequences in said at least one training document, (c) computing a set of global a priori probabilities using a latent semantic paradigm based on relative frequency counts of global word sequences in said at least one training document, and (d) combining the local a priori probabilities and the global a priori probabilities to provide the multiple-span stochastic language model.

44. The system of claim 43, comprising means for storing the a priori probabilities.

45. The system of claim 43, wherein said processor combines the local and global a priori probabilities to form a set of hybrid a priori probabilities.

* * * * *